United States Patent
Nassar et al.

(10) Patent No.: US 11,645,381 B2
(45) Date of Patent: May 9, 2023

(54) USER CONFIGURED ONE-TIME PASSWORD

(71) Applicant: International Business Machines Corporation, Armonk, NY (US)

(72) Inventors: Nader M. Nassar, Yorktown Heights, NY (US); Tamer Nassar, Fairfield, CT (US); John E. Moore, Jr., Pflugerville, TX (US); John Yow-Chun Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/118,676

(22) Filed: Dec. 11, 2020

(65) Prior Publication Data

US 2022/0188400 A1    Jun. 16, 2022

(51) Int. Cl.
G06F 21/46    (2013.01)
H04L 9/40    (2022.01)

(52) U.S. Cl.
CPC .......... G06F 21/46 (2013.01); H04L 63/0838 (2013.01); H04L 63/20 (2013.01)

(58) Field of Classification Search
CPC ... H04L 63/0838; H04L 63/083; H04L 63/20; G06F 21/31; G06F 21/46
See application file for complete search history.

(56) References Cited

U.S. PATENT DOCUMENTS

| | | | | |
|---|---|---|---|---|
| 6,081,893 A * | 6/2000 | Grawrock | ............. | H04L 9/0891 380/282 |
| 6,292,896 B1 * | 9/2001 | Guski | ................... | H04L 9/3228 713/169 |
| 8,255,696 B2 | 8/2012 | Florencio | | |
| 9,218,476 B1 | 12/2015 | Roth | | |
| 9,230,092 B1 | 1/2016 | Juels | | |
| 9,306,942 B1 | 4/2016 | Bailey | | |
| 9,985,941 B2 | 5/2018 | Childress | | |
| 10,574,692 B2 | 2/2020 | Drake | | |

(Continued)

FOREIGN PATENT DOCUMENTS

| | | |
|---|---|---|
| CN | 102780698 A | 11/2012 |
| CN | 103957106 A | 7/2014 |

OTHER PUBLICATIONS

Alghathbar et al., "Noisy Password Scheme: A New One Time Password System", 2009 Canadian Conference on Electrical and Computer Engineering, IEEE, 2009, pp. 841-846.

(Continued)

*Primary Examiner* — Dao Q Ho
(74) *Attorney, Agent, or Firm* — Stephanie L. Carusillo

(57) ABSTRACT

A tool for providing a user configured one-time password. Responsive to receiving a request for a one-time password, the tool sends the one-time password, based at least in part, on a user configured one time password rule. The tool receives a user configured one-time password return value for the one time password. The tool determines whether the user configured one-time password return value satisfies the user configured one-time password rule when applied to the one-time password. Responsive to a determination that the user configured one-time password return value satisfies the user configured one time password rule, the tool accepts the user configured one-time password return value and granting access to the application.

17 Claims, 3 Drawing Sheets

(56) References Cited

U.S. PATENT DOCUMENTS

| | | | |
|---|---|---|---|
| 2007/0039042 A1* | 2/2007 | Apelbaum | H04L 9/14 726/6 |
| 2008/0276098 A1 | 11/2008 | Florencio | |
| 2010/0319058 A1 | 12/2010 | Chen | |
| 2013/0185779 A1* | 7/2013 | Tamai | H04L 63/0838 726/6 |
| 2015/0319165 A1* | 11/2015 | Marsh | H04L 63/0853 726/6 |
| 2016/0080366 A1* | 3/2016 | Agarwal | H04L 63/0838 726/6 |
| 2017/0068814 A1 | 3/2017 | Childress | |
| 2017/0308872 A1 | 10/2017 | Uhr | |
| 2019/0312858 A1 | 10/2019 | Johansson | |
| 2021/0279324 A1* | 9/2021 | Orozco Cervantes | H04L 9/3226 |
| 2022/0131849 A1* | 4/2022 | Rozenbaum | H04L 63/083 |

OTHER PUBLICATIONS

Gong et al. "A novel one-time password mutual authentication scheme on sharing renewed finite random sub-passwords", Journal of Computer and System Sciences 79 (2013), Available online Jun. 29, 2012, pp. 122-130.

Wang et al., "User's Authentication in Media Services by using One-Time Password Authentication Scheme", Third International Conference on Intelligent Information Hiding and Multimedia Signal Processing (IIH-MSP 2007) vol. 1, IEEE, 2007, 6 pages.

"User Configured One-Time Password", International application No. PCT/CN2021/131841, International filing date Nov. 19, 2021, 31 pages.

Patent Cooperation Treaty, PCT, Notification of Transmittal of the International Search Report and the Written Opinion of the International Searching Authority, or the Declaration, dated Feb. 15, 2022, Applicant's or agent's file reference IEE210906PCT, International application No. PCT/CN2021/131841, International filing date Nov. 19, 2021 (Nov. 19, 2021), 9 pages.

* cited by examiner

USER CONFIGURED ONE-TIME PASSWORD

BACKGROUND OF THE INVENTION

The present invention relates generally to cyber security, and more particularly to two-factor authentication.

One-time passwords (OTPs), also known as a one-time personal identification number (one-time PIN) or dynamic password, is a known solution to protect against common cyber-attacks, such as brute force attacks, password guessing attacks, man-in-the-middle attacks, and various other conventional attacks. OTPs are passwords that are valid for only one session or transaction on a computing device. A number of implementations incorporate two-factor authentication by ensuring that the OTP requires access to something a person has (e.g., specific mobile device, a keyring fob device with an integrated OTP calculator, or a smartcard, etc.), as well as something a person knows (e.g., a PIN, a security word, or an answer to a challenge question, etc.).

SUMMARY

Aspects of an embodiment of the present invention disclose a method, computer program product, and computer system for providing a user configured one-time password. Responsive to receiving a request for a one-time password, the method includes sending, by the one or more computer processors, the one-time password, based at least in part, on a user configured one time password rule. The method includes receiving, by the one or more computer processors, a user configured one-time password return value for the one time password. The method includes determining, by the one or more computer processors, whether the user configured one-time password return value satisfies the user configured one-time password rule when applied to the one-time password. Responsive to a determination that the user configured one-time password return value satisfies the user configured one time password rule, the method includes accepting, by the one or more computer processors, the user configured one-time password return value and granting access to the application.

DETAILED DESCRIPTION

Embodiments of the present invention recognize that conventional two-factor authentication solutions utilizing one-time passwords can be vulnerable to various cyber-attacks, such as short message service (SMS) cloning, request interception, and the like. Embodiments of the present invention recognize that one-time passwords (OTPs) can be compromised from a server side attack by breaking into a seed generator, which is used to generate the pseudo random values for the OTPs. Embodiments of the present invention further recognize that OTPs can be compromised from a client side attack where one-time password requests are intercepted or where one-time password requests are utilizing a brute force attack, consisting of an attacker submitting many passwords with hopes of eventually guessing the correct combination of values. Embodiments of the present invention recognize that there are shortcomings in a two-factor authentication security system where a user must return a received one-time password in its entirety.

Embodiments of the present invention provide the capability to enhance two-factor authentication methods utilizing a custom user configurable one-time password rule to obfuscate one-time passwords used during two-factor authentication. Embodiments of the present invention provide the capability to utilize a user configurable subset of a two-factor authentication challenge to provide additional authenticity. Embodiments of the present invention provide the capability to improve a "something you have" security principle by adding a "something you know" security principle on top of it, where instead of requiring a user to return a one-time password exactly as it was received (i.e., identical to the one-time password presented to the user), the user is able to configure a custom one-time password rule that dictates what value the user returns in response to receiving a one-time password, thereby ensuring the one-time password and the return value for the one-time password are not identical.

Implementation of such embodiments may take a variety of forms, and exemplary implementation details are discussed subsequently with reference to the Figures.

Figure 1:
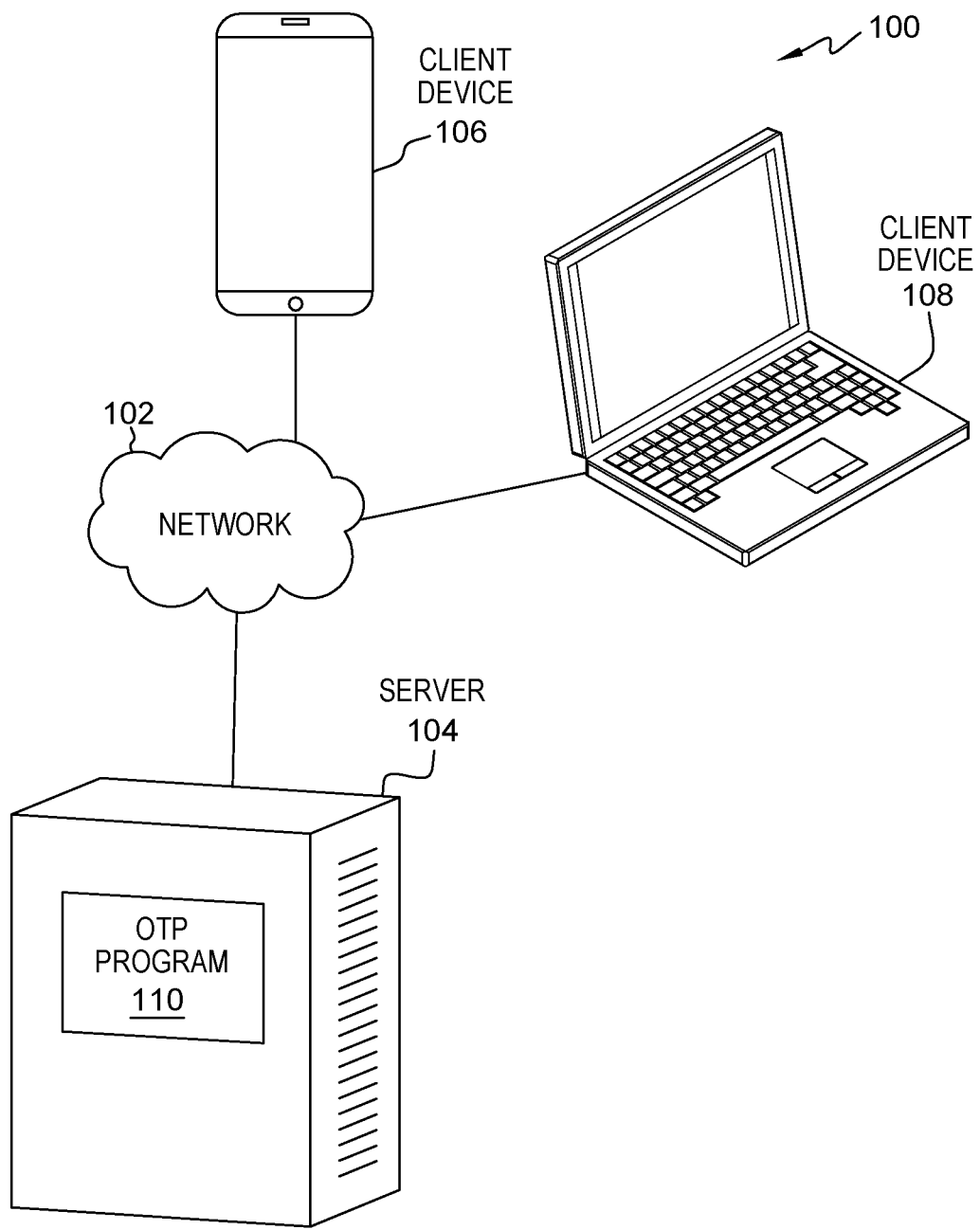
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing a user configurable OTP return value, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client devices, such as client device 106 and client device 108.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, and client device 108 are interconnected by network 102. Network 102 can be any combination of connections and protocols capable of supporting communications between server 104, client device 106, client device 108 and OTP program 110. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, and OTP program 110, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes OTP program 110 for providing a user configurable OTP return value on a client device, such as client device 106 and client device 108.

In one embodiment, OTP program 110 operates on a central server, such as server 104, and can be utilized by one or more client devices, such as client device 106 and client device 108, via an application download from the central server or a third-party application store, and executed on the one or more client devices. In another embodiment, OTP program 110 may be software, downloaded from a central server, such as server 104, and installed on one or more client devices, such as client device 106 and client device 108. In yet another embodiment, OTP program 110 may be utilized as a software service provided by a third-party cloud service provider (not shown). In yet another embodiment, OTP program 110 may include one or more components, such as add-ons, plug-ins, and agent programs, etc. (not shown), installed on one or more client devices, such as client device 106 and client device 108, to provide a user configurable OTP return value. In one embodiment, OTP program 110 can be an add-on feature for an enabled two-factor authentication security system (not shown), where the add-on feature enables a user to configure a unique value to return when a one-time password is received during two-factor authentication. In one embodiment, OTP program 110 can be fully integrated with an enabled two-factor authentication security system. In some embodiments, OTP program 110 may be partially integrated or separate from an enabled two-factor authentication security system. In one embodiment, OTP program 110 may be an application, downloaded from an application store or third party provider, capable of being used in conjunction with an enabled two-factor authentication security system on a client device, such as client device 106 and client device 108, to provide a user configurable OTP return value for use during two-factor authentication.

In one embodiment, OTP program 110 can be utilized by a client device, such as client device 106 and client device 108, to enable a user to configure OTP return values for use during two-factor authentication. In one embodiment, OTP program 110 provides the capability for a user to configure a one-time password rule that dictates what one-time password return value to use when responding to a one-time password received during two-factor authentication. In one embodiment, OTP program 110 provides the capability for a user to configure a one-time password rule that determines a subset combination of values from a set of values of a one-time password received during two-factor authentication. In one embodiment, OTP program 110 provides the capability for a user to configure a one-time password rule that modifies a one-time password received during two-factor authentication, such that an acceptable one-time password return value differs from the received one-time password in a unique way that conforms with the user configured one-time password rule. In one embodiment, OTP program 110 provides the capability for a user to ensure that even where a received one-time password is intercepted during two-factor authentication, an adversary would not be able to leverage the received one-time password without also knowing the user configured one-time password rule, since an acceptable one-time password return value will be a subset combination of values from the received one-time password according to the user configured one-time password rule.

In one embodiment, OTP program 110 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. OTP program 110 enables the authorized and secure processing of personal data. In one embodiment, OTP program 110 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, OTP program 110 provides information regarding personal data and the nature (e.g., type, scope, purpose, duration, etc.) of the processing. In one embodiment, OTP program 110 provides a user with copies of stored personal data. In one embodiment, OTP program 110 allows the correction or completion of incorrect or incomplete personal data. In one embodiment, vehicle OTP program 110 allows the immediate deletion of personal data.

In one embodiment, client device 106 and client device 108 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize an enabled two-factor authentication security system, and utilize one or more software applications. In another example, client device 106 and client device 108 may be an on-board computer integrated within a motor vehicle. In one embodiment, client device 106 and client device 108 may be any suitable type of client device capable of executing one or more applications utilizing a mobile operating system. In one embodiment, client device 106 and client device 108 may include a user interface (not shown) for providing a user with the capability to interact with OTP program 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106 and client device 108 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106 and client device 108 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106 and client device 108 each represent one or more programmable electronic devices or combination of programmable electronic devices capable of executing machine readable program instructions and communicating with other computing devices (not shown) within data processing environment 100 via a network, such as network 102.

Figure 2:
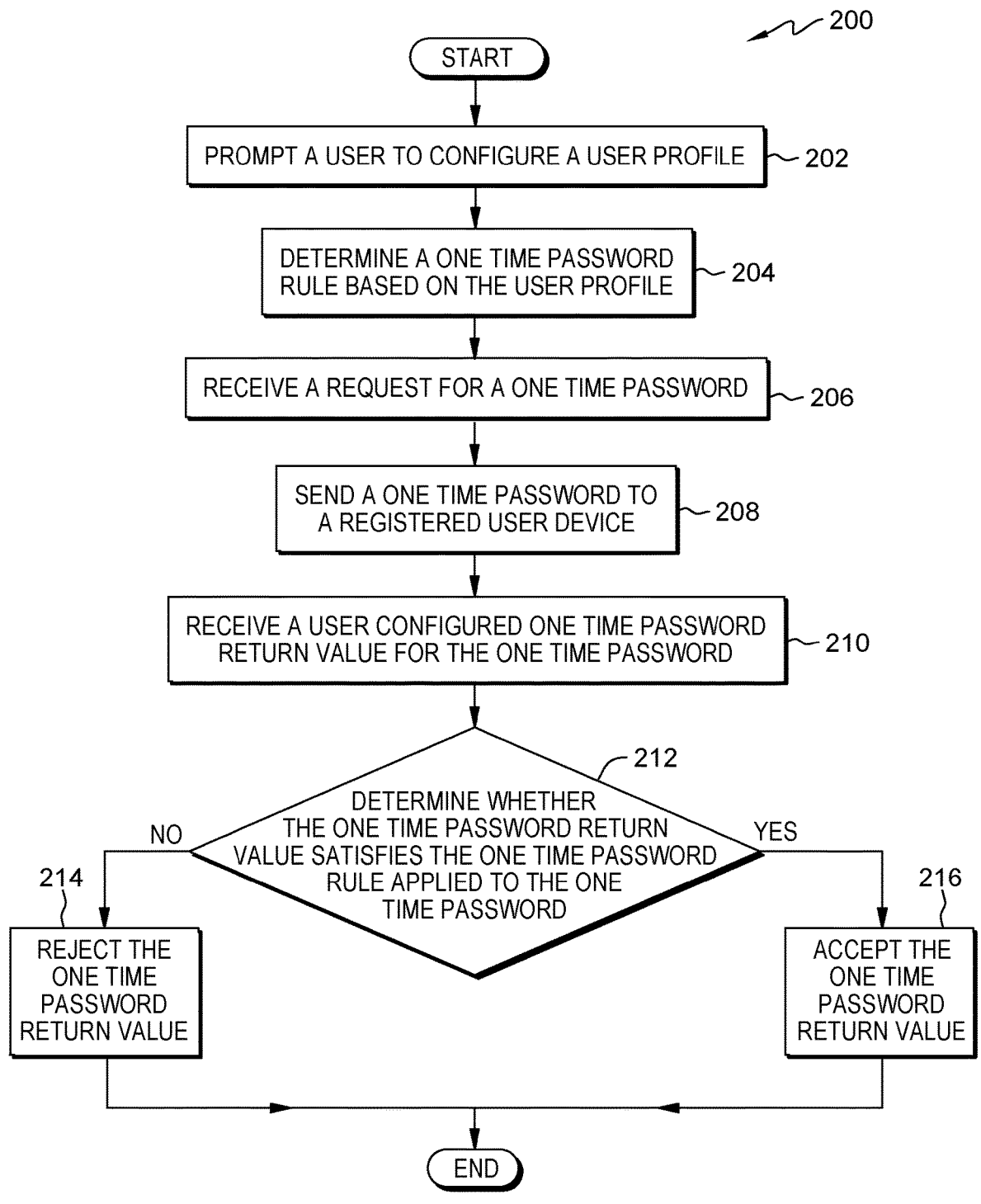
FIG. 2 is a flowchart depicting operational steps of a one-time password program (OTP program), such as the OTP program of FIG. 1, generally designated 200, for providing a user configurable OTP return value, in accordance with an embodiment of the present invention.

FIG. 2 is a flowchart depicting operational steps of one-time password program (OTP program), such as OTP program 110, generally designated 200, for providing a user configurable OTP return value for use during two-factor authentication, in accordance with an embodiment of the present invention.

OTP program 110 prompts a user to configure a user profile (202). In one embodiment, OTP program 110 prompts a user to configure a user profile for use during two-factor authentication. In one embodiment, OTP program 110 prompts a user to configure a user profile via a user interface on a client device, such as client device 108. In one embodiment, OTP program 110 will prompt a user to configure a user profile that includes, without limitation, user profile data (e.g., username, actual name, email address, phone number of the mobile device, etc.), two-factor authentication settings, a user configured one-time password rule, and information related to a registered mobile device for the user, such as client device 106. In one embodiment, OTP program 110 prompts a user to configure a one-time password rule for use during two-factor authentication, where prompting the user to configure the one-time password rule includes generating a plurality of one-time password rule options and presenting the user with the plurality of one-time password rule options to select from when configuring the one-time password rule (i.e., selections). In one embodiment, OTP program 110 may present the user with options to configure the one-time password rule, including, but not limited to, a first option that states "an acceptable one-time password return value will be a sum of all the digits in a received one-time password", second option that states "an acceptable one-time password return value will be an average of all the digits in a received one-time password", a third option that states "an acceptable one-time password return value will be a subset of digits taken from all the digits in a received one-time password", and a fourth option that states "an acceptable one-time password return value will be specific digits selected from all the digits in a received one-time password". In one embodiment, OTP program 110 presents the user with options to further modify or edit the one-time password rule, such as dictate a length of a one-time password, values for the one-time password (e.g., alphanumeric values), and configuration of an acceptable one-time password return value.

For example, OTP program 110 may prompt a user to configure a one-time password rule and present the user with a plurality of options. The user may choose to select an option that states "an acceptable one-time password return value will be specific digits selected from all the digits in a received one-time password", and the user may then further modify the one-time password rule by specifying that "received one-time passwords will be twelve digits long", and "the user configured one-time password rule will be to accept one-time password return values that include only the last six digits of the twelve digit one-time password".

In yet another example, OTP program 110 may prompt a user to configure a one-time password rule and present the user with a plurality of options. The user may choose to select an option that states "an acceptable one-time password return value will be a subset of digits taken from all the digits in a received one-time password", and the user may then further modify the one-time password rule by specifying that "received one-time passwords will be ten characters long, including both numeric and alphanumeric values", and "the user configured one-time password rule will be to accept one-time password return values that include only the alphanumeric values of the ten character one-time password".

In an alternative embodiment, OTP program 110 may present the user with options to configure the one-time password rule with a time constraint component enabling a user to set a pre-defined time period for which to apply a first one-time password rule to a received one-time password, and upon expiration of the pre-defined time period, then apply a second one-time password rule to the received one-time password. For example, a user configured one-time password rule including a time constraint component may state "for a received one-time password active for ten minutes, during the first five minutes the received one-time password is active, accept one-time password return values that include only the last six digits of a twelve digit one-time password, and during the last five minutes the received one-time password is active, accept one-time password return values that include only the first six digits of the twelve digit one-time password".

OTP program 110 determines a one-time password rule based on the user profile (204). In one embodiment, OTP program 110 determines the one-time password rule based, at least in part, on the user profile by referencing one or more one-time password rule options selected by the user for configuring the one-time password rule. In one embodiment, OTP program 110 converts the one or more options selected by the user for configuring the one-time password rule into computer readable code that can be executable by one or more computer processors. In one embodiment, OTP program 110 generates code for each of the one or more options selected by the user for configuring the one-time password rule, such that the one-time password rule can be applied to a one-time password to calculate an acceptable one-time password return value. In one embodiment, OTP program 110 can utilize the generated one-time password rule in subsequent steps to verify whether a user configured onetime password return value satisfies the one-time password rule when applied to a one-time password (see decision block 212).

OTP program 110 receives a request for a one-time password (206). In one embodiment, OTP program 110 receives a request for a one-time password when a user attempts to login to an application on client device, such as client device 108.

OTP program 110 sends a one-time password to a registered user device (208). In one embodiment, OTP program 110 sends a one-time password to a registered user device, such as client device 106. In one embodiment, OTP program 110 references the user profile to determine a user device registered in the user profile and retrieves information related to the registered user device. In one embodiment, the registered user device, such as client device 106, is a mobile device of a user designated in a user profile as a preferred contact device for receiving a one-time password. In one embodiment, OTP program 110 prompts the user to calculate a user configured one-time password return value for the one-time password. In one embodiment, the user will apply the user configured one-time password rule to the one-time password to arrive at a user configured one-time password return value.

For example, where OTP program 110 sends a one-time password, such as "12345", to a registered user device, such as client device 106, a user of the registered user device will be prompted to enter a user configured one-time password return value into a second client device that the user is attempting to access an application, such as client device 108. The user would enter a user configured one-time password return value of "15" based on the user configured one-time password rule that states "an acceptable one-time password return value will be a sum of all the digits in a received one-time password".

OTP program 110 receives a user configured one-time password return value for the one-time password (210). In one embodiment, OTP program 110 receives the user configured one-time password return value in response to sending the one-time password to the registered user device. In one embodiment, OTP program 110 receives the user configured one-time password return value on an authenticating server, such as server 104. For example, OTP program may receive a user configured one-time password return value of "15" in response to sending a one-time password of "12345".

OTP program 110 determines whether the user configured one-time password return value satisfies the one-time password rule applied to the one-time password (decision block 212). In one embodiment, OTP program 110 determines whether the one-time password return value satisfies the one-time password rule when applied the one-time password by retrieving the user configured one-time password rule from a user profile of a user that requested the one-time password. In one embodiment, OTP program 110 applies the user configured one-time password rule to the one-time password sent to the user to determine an acceptable (i.e., verifiable) one-time password return value. For example, where OTP program 110 sent a one-time password of "12345" to a user, and where OTP program 110 retrieved a user configured one-time password rule from the user profile that states "an acceptable one-time password return value will be a sum of all the digits in a received one-time password", OTP program 110 applies the user configured one-time password rule to the one-time password to determine an acceptable one-time password return value of "15". In one embodiment, OTP program 110 compares the determined acceptable one-time password return value to the user configured one-time password return value sent from the user. Where OTP program 110 determines that the user configured one-time password return value matches the determined acceptable one-time password return value, OTP program 110 determines that the user configured one-time password return value satisfies the one-time password rule, and positively verifies the user configured one-time password return value as authentic (e.g., OTP program 110 marks the one-time password return value as authentic). Where OTP program 110 determines that the user configured one-time password return value does not match the determined acceptable one-time password return value, OTP program 110 determines that the user configured one-time password return value does not satisfy the one-time password rule, and fails to verify the user configured one-time password return value as authentic (e.g., OTP program 110 flags the one-time password return value as fraudulent).

For example, where OTP program 110 applies a user configured one-time password rule to a one-time password of "12345", and where OTP program 110 determines an acceptable one-time password return value is "15" based on the user configured one-time password rule, OTP program 110 determines the user configured one-time password return value of "15" sent by the user matches the acceptable one-time password return value of "15", and verifies that the user configured one-time password return value is authentic and satisfies the user configured one-time password rule as applied to the one-time password.

Responsive to a determination that the one-time password return value does not satisfy the one-time password rule as applied to the one-time password (decision block 212, NO branch), OTP program 110 rejects the one-time password return value and denies access to the application (214).

Responsive to determination that the one-time password return value satisfies the one-time password rule as applied to the one-time password (decision block 212, YES branch), OTP program 110 accepts the one-time password return value and grants access to the application (216).

Figure 3:
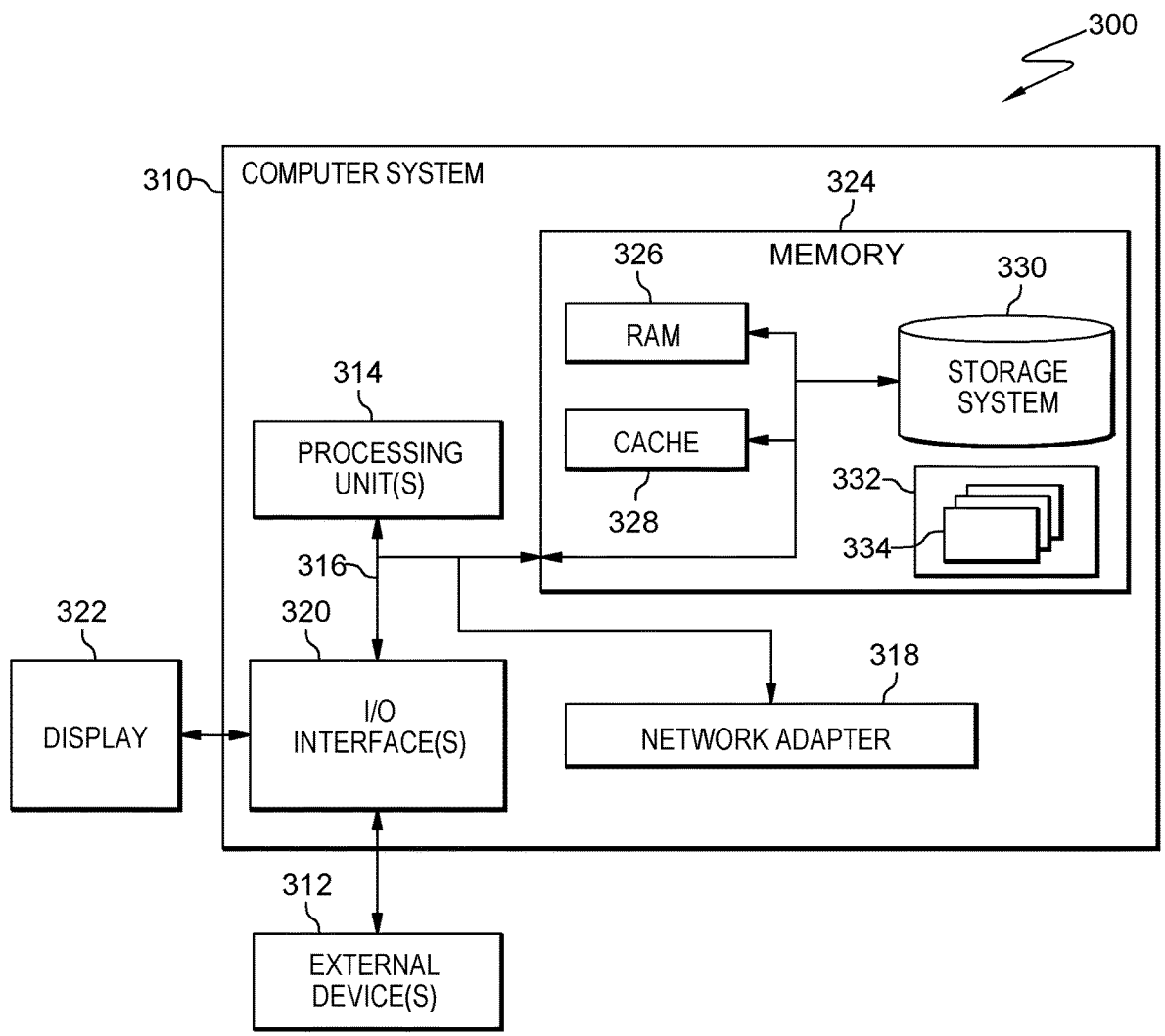
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method, the method comprising:
  prompting, by one or more computer processors, a user to configure a one-time password rule for use when accessing an application, wherein prompting the user to configure the one-time password rule for use when accessing the application further comprises:
    prompting, by one or more computer processors, a user to configure a user profile for use during a two-factor authentication when accessing an application;
    generating, by the one or more computer processors, a plurality of one-time password rule options, wherein the plurality of one-time password rule options include a first option of an acceptable one-time password return value is a sum of all digits in the one-time password, a second option of the acceptable one-time password return value is an average of all the digits in the one-time password, a third option of the acceptable one-time password return value is a subset of digits taken from all the digits in the one-time password, and a fourth option of the acceptable one-time password return value is specific digits selected from all the digits in the one-time password;
    presenting, by the one or more computer processors, the plurality of one-time password rule options to the user; and
    receiving, by the one or more computer processors, a selection of the at least one of the plurality of one-time password rule options from the user, wherein the selection of the at least one of the plurality of one-time password rule options includes one or more user modifications to at least one of the plurality of one-time password rule options;
  responsive to receiving a request for a one-time password, sending, by the one or more computer processors, the one-time password, based at least in part, a user configured one time password rule;
  receiving, by the one or more computer processors, a user configured one-time password return value for the one-time password;
  determining, by the one or more computer processors, whether the user configured one-time password return value satisfies the user configured one-time password rule when applied to the one-time password; and
  responsive to a determination that the user configured one-time password return value satisfies the user configured one-time password rule, accepting, by the one or more computer processors, the user configured one-time password return value and granting access to the application.

2. The method of claim 1, wherein prompting the user to configure the one-time password for use when accessing the application further comprises:
  prompting, by the one or more computer processors, the user to select a time constraint component to use with the selection of at least one of the plurality of one-time password rules, wherein the time constraint component is a pre-defined time period to apply a first one-time password rule to the one-time password, and upon expiration of the pre-defined time period, apply a second one-time password rule to the one-time password.

3. The method of claim 1, further comprising:
  generating, by the one or more computer processors, the user configured one-time password rule based, at least in part, on a selection of at least one of a plurality of one-time password rule options, wherein generating the user configured one-time password rule includes generating code for the selection of at least one of the plurality of password rule options converting the code into the user configured one-time password rule to be applied to the one-time password to calculate an acceptable one-time password return value.

4. The method of claim 1, wherein determining whether the user configured one-time password return value satisfies the user configured one-time password rule when applied to the one-time password, further comprises:

retrieving, by the one or more computer processors, the user configured one-time password rule from the user profile; and determining, by the one or more computer processors, an acceptable one-time password return value.

5. The method of claim 4, wherein determining the acceptable one-time password return value, further comprises:

applying, by the one or more computer processors, the user configured one-time password rule to the one-time password to calculate the acceptable one-time password return value.

6. The method of claim 4, further comprising:

comparing, by the one or more computer processors, the acceptable one-time password return value to the user configured one-time password return value; and determining, by the one or more computer processors, the user configured one-time password return value satisfies the user configured one-time password rule where the acceptable one-time password return value matches the user configured one-time password return value.

7. A computer program product, the computer program product comprising:

one or more computer readable storage medium and program instructions stored on the one or more computer readable storage medium, the stored program instructions comprising:

program instructions to prompt a user to configure a one-time password rule for use when accessing an application, wherein prompting the user to configure the one-time password rule for use when accessing the application further comprises:

program instructions to prompt a user to configure a user profile for use during a two-factor authentication when accessing an application;

program instructions to generate the plurality of one-time password rule options, wherein the plurality of one-time password rule options include a first option of an acceptable one-time password return value is a sum of all digits in the one-time password, a second option of the acceptable one-time password return value is an average of all the digits in the one-time password, a third option of the acceptable one-time password return value is a subset of digits taken from all the digits in the one-time password, and a fourth option of the acceptable one-time password return value is specific digits selected from all the digits in the one-time password;

program instructions to present the plurality of one-time password rule options to the user; and program instructions to receive a selection of the at least one of the plurality of one-time password rule options from the user, wherein the selection of the at least one of the plurality of one-time password rule options includes one or more user modifications to at least one of the plurality of one-time password rule options;

program instructions to, responsive to receiving a request for a one-time password, send the one-time password, based at least in part, on a user configured one time password rule;

program instructions to receive a user configured one-time password return value for the one time password;

program instructions to determine whether the user configured one-time password return value satisfies the user configured one-time password rule when applied to the one-time password; and program instructions to, responsive to a determination that the user configured one-time password return value satisfies the user configured one time password rule, accept the user configured one-time password return value and granting access to the application.

8. The computer program product of claim 7, wherein prompting the user to configure the one-time password rule for use when accessing the application further comprises:

program instructions to prompt the user to select a time constraint component to use with the selection of at least one of the plurality of one-time password rules, wherein the time constraint component is a pre-defined time period to apply a first one-time password rule to the one-time password, and upon expiration of the pre-defined time period, apply a second one-time password rule to the one-time password.

9. The computer program product of claim 7, further comprising:

program instructions to generate the user configured one-time password rule based, at least in part, on a selection of at least one of a plurality of one-time password rule options, wherein generating the user configured one-time password rule includes generating code for the selection of at least one of the plurality of password rule options converting the code into the user configured one-time password rule to be applied to the one-time password to calculate an acceptable one-time password return value.

10. The computer program product of claim 7, wherein the program instructions to determine whether the user configured one-time password return value satisfies the user configured onetime password rule when applied to the one-time password, further comprises:

program instructions to retrieve the user configured one-time password rule from the user profile; and program instructions to determine an acceptable one-time password return value.

11. The computer program product of claim 10, wherein the program instructions to determine the acceptable one-time password return value, further comprises:

program instructions to apply the user configured one-time password rule to the one-time password to calculate the acceptable one-time password return value.

12. The computer program product of claim 10, further comprising:

program instructions to compare the acceptable one-time password return value to the user configured one-time password return value; and program instructions to determine the user configured one-time password return value satisfies the user configured one-time password rule where the acceptable one-time password return value matches the user configured one-time password return value.

13. A computer system, the computer system comprising:

one or more computer hardware processors;

one or more computer readable storage medium; and program instructions stored on at least one of the one or more computer readable storage medium for execution by at least one of the one or more computer processors, the stored program instructions comprising:
  program instructions to prompt a user to configure a one-time password rule for use when accessing an application, wherein prompting the user to configure the one-time password rule for use when accessing the application further comprises:
    program instructions to prompt a user to configure a user profile for use during a two-factor authentication when accessing an application;
    program instructions to generate the plurality of one-time password rule options, wherein the plurality of one-time password rule options include a first option of an acceptable one-time password return value is a sum of all digits in the one-time password, a second option of the acceptable one-time password return value is an average of all the digits in the one-time password, a third option of the acceptable one-time password return value is a subset of digits taken from all the digits in the one-time password, and a fourth option of the acceptable one-time password return value is specific digits selected from all the digits in the one-time password;
    program instructions to present the plurality of one-time password rule options to the user; and
    program instructions to receive a selection of the at least one of the plurality of one-time password rule options from the user, wherein the selection of the at least one of the plurality of one-time password rule options includes one or more user modifications to at least one of the plurality of one-time password rule options;
  program instructions to, responsive to receiving a request for a one-time password, send the one-time password, based at least in part, on a user configured one time password rule;
  program instructions to receive a user configured one-time password return value for the one time password;
  program instructions to determine whether the user configured one-time password return value satisfies the user configured one-time password rule when applied to the one-time password; and
  program instructions to, responsive to a determination that the user configured one-time password return value satisfies the user configured one time password rule, accept the user configured one-time password return value and granting access to the application.

14. The computer system of claim 13, wherein prompting the user to configure the one-time password rule for use when accessing the application further comprises:
  program instructions to prompt the user to select a time constraint component to use with the selection of at least one of the plurality of one-time password rules, wherein the time constraint component is a pre-defined time period to apply a first one-time password rule to the one-time password, and upon expiration of the pre-defined time period, apply a second one-time password rule to the one-time password.

15. The computer system of claim 13, further comprising:
  program instructions to generate the user configured one-time password rule based, at least in part, on a selection of at least one of a plurality of one-time password rule options, wherein generating the user configured one-time password rule includes generating code for the selection of at least one of the plurality of password rule options converting the code into the user configured one-time password rule to be applied to the one-time password to calculate an acceptable one-time password return value.

16. The computer system of claim 13, wherein the program instructions to determine whether the user configured one-time password return value satisfies the user configured one-time password rule when applied to the one-time password, further comprises:
  program instructions to retrieve the user configured one-time password rule from the user profile; and
  program instructions to determine an acceptable one-time password return value.

17. The computer system of claim 16, further comprising:
  program instructions to compare the acceptable one-time password return value to the user configured one-time password return value; and
  program instructions to determine the user configured one-time password return value satisfies the user configured one-time password rule where the acceptable one-time password return value matches the user configured one-time password return value.

* * * * *